United States Patent [19]

Guenin

[11] 4,005,930
[45] Feb. 1, 1977

[54] ELASTIC HINGE FOR A PAIR OF SPECTACLES

[75] Inventor: André Guenin, Petit-Lancy, Switzerland

[73] Assignee: La Nationale S.A., Geneva, Switzerland

[22] Filed: Jan. 13, 1975

[21] Appl. No.: 540,592

[30] Foreign Application Priority Data

Jan. 19, 1974 Switzerland .................... 534/74

[52] U.S. Cl. ............................ 351/113; 16/128 A; 351/115; 351/153
[51] Int. Cl.² .................... G02C 5/16; G02C 5/20; G02C 5/22
[58] Field of Search .......... 351/113, 115, 121, 153; 16/128 A

[56] References Cited

UNITED STATES PATENTS

| 3,572,914 | 3/1971 | Piola et al. ........................ 351/113 |
| 3,644,023 | 2/1972 | Villani .............................. 351/113 |

*Primary Examiner*—Paul A. Sacher
*Attorney, Agent, or Firm*—Emory L. Groff, Jr.

[57] ABSTRACT

A resilient hinge for a pair of spectacles comprises a first part fixed to the spectacle frame and a second part hinged on the first part. The second part is extended by a cylindrical tube on which is slidably mounted a cylindrical sleeve to which an arm is fixed. A transverse pin fixed in the sleeve passes through opposed slots in the tube to angularly fix the sleeve on the tube. A spring in the tube urges a yoke-shaped stud against said pin to bias said tube, relative to said sleeve, towards the free end of the arm. Angular positioning of the tube and sleeve can be provided by cooperating longitudinal ribs.

4 Claims, 5 Drawing Figures

ELASTIC HINGE FOR A PAIR OF SPECTACLES

The invention relates to resilient hinges for pairs of spectacles, of the type comprising a first part adapted to be rigidly fixed to a spectacle frame, a second part hinged to the first part and resiliently connected to an arm of the pair of spectacles, said second part being integral with a piece slidably mounted in a casing adapted to be fixed to said arm. A spring is disposed in said casing and acts on said piece to bias said second part towards the free end of said arm.

Known resilient hinges of this type are relatively large and are not suitable for spectacles with a relatively slender frame and arms.

An object of the invention is to enable the provision of such resilient hinges of simple construction and low profile and which may for example be fixed to slender metallic arms without spoiling the aesthetic effect of the assembly.

The invention therefore provides an improvement in such a hinge wherein said casing has a longitudinal cylindrical housing, and said sliding piece is formed by a tube of circular cross-section slidably mounted in said housing. The housing has a transverse pin engaged in at least one longitudinal slot disposed along a generatrix of the tube. The spring is lodged within said tube and bears on the one hand against said pin and on the other hand against a stop at the end of said tube, and means are provided for fixing the angular position of the circular tube in the cylindrical housing.

The accompanying drawings show, schematically and by way of example, three embodiments of hinges according to the invention. In the drawings.

Figure 1:
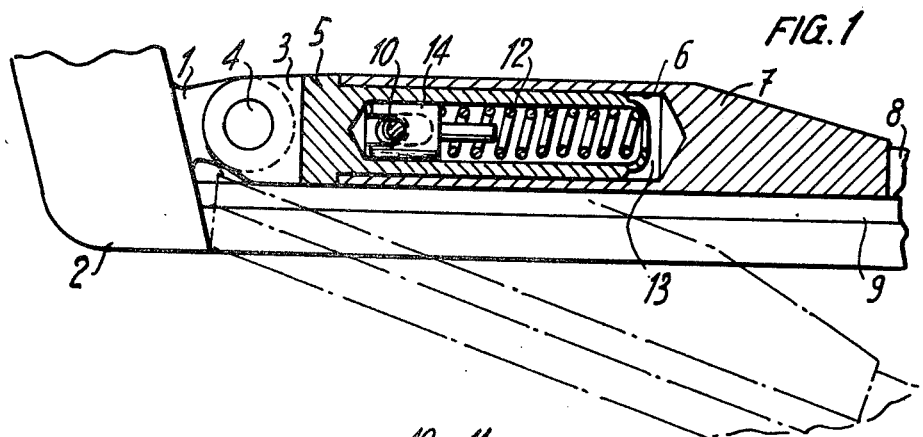
FIGS. 1 and 2 are two cross-sections of the first embodiment, the cross-sections being taken longitudinally of an arm of a pair of spectacles and being orthogonal to one another.
Figure 2:
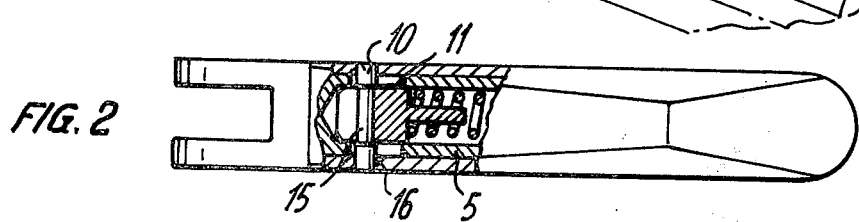

The hinge shown in FIGS. 1 and 2 comprises a first part 1 rigidly fixed, for example by molding, to a frame 2 of a pair of spectacles. A second part 3 is hinged on part 1 by means of a pivot or shoulder screw 4. Part 3 of the hinge is provided with an extension comprising an integral tubular piece 5 of circular section slidably mounted in a longitudinal cylindrical bore defining the housing 6 of a casing 7 secured to an arm 8 by welding the casing 7 to a metallic reinforcement 9 of the arm 8.

The angular position of the sliding piece 5 in relation to casing 7 is defined by a transverse pin 10 engaging in two longitudinal slots 11 of piece 5, these slots being disposed along two opposed generatrices of the tubular part of piece 5 adjacent its closed inner end. A spring 12 lodged in the tubular part of piece 5 bears on the one hand against a bent over edge 13 at the open outer end of the tubular part of piece 5 and on the other hand against a yoke-shaped stud 14 bearing on pin 10 to thus elastically bias the hinge part 3, relative to casing 7, towards the free end of arm 8.

As shown in FIG. 2, the pin 10 has a median portion 15 of lesser diameter than its ends so that when the pin 10 is in position, it is axially held by the stud 14. The two arms of the yoke-shaped stud 14 are spaced apart from one another by an amount at least equal to the diameter of the end portions of pin 10, but under the action of spring 12 the bottom of the space between the yoke arms comes to bear against the smaller-diameter portion 15. The yoke is thus engaged between the two larger-diameter end portions of pin 10 and prevents any outward movement thereof.

To insert the pin 10, it is necessary to push back the stud 14 against the action of spring 12; this is easily achieved by passing through the slots 11 and the corresponding holes 16 of casing 7 a rod with a conical head facilitating insertion, the diameter of this rod being equal to that of the end portions of pin 10. When inserted, this rod thus pushes back stud 14 against the action of spring 12, and the pin 10 is inserted end-to-end following the rod. As soon as the pin 10 has reached its final position, and the said rod has thus been completely pushed out of the passageway, the stud 14 is urged by the spring 12 to engage between the two end portions of the pin 10 to lock it in position.

In this embodiment, the casing 7 can no longer be removed from the hinge part 3 once the pin 10 has been inserted. To enable dismantling, a trunco-conical or other progressively varying surface could be provided between the larger and smaller diameter portions of pin 10 and/or flared surfaces provided on the edges of the yoke arms of stud 14.

Figure 3:
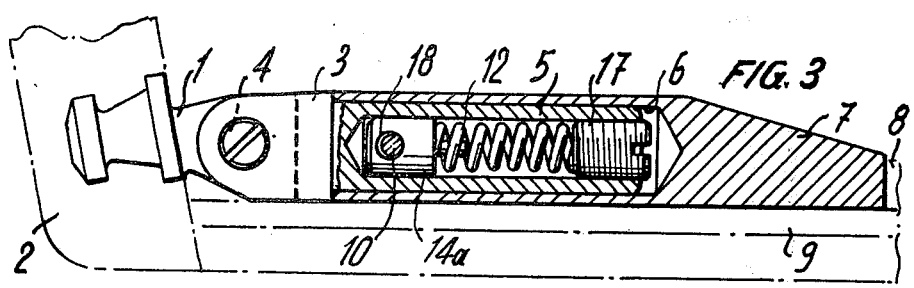
FIGS. 3 and 4 are similar cross-sections of a second embodiment.
Figure 4:
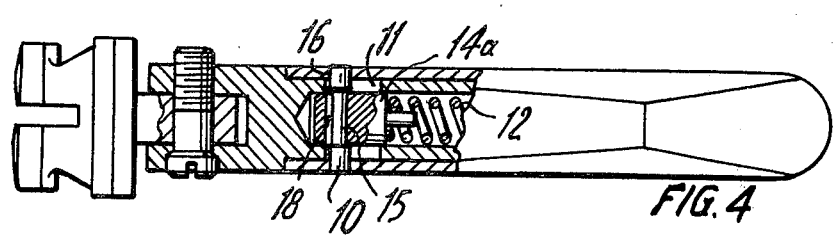

The second embodiment, shown in FIGS. 3 and 4, is similar to the first and the same parts are designated by the same reference numerals. This second embodiment is differentiated in that, at the open end of the tubular part of piece 5, the spring 12 is supported by a plug or stopper 17 screwably engaged in a corresponding thread of piece 5. The other end of spring 12 bears against a stud 14a which is not yoke-shaped but simply has a transverse bore 18 of a sufficient diameter to allow passage of the larger diameter end portions of pin 10. When the pin 10 is in position, the stud 14a engages between the end portions of pin 10 until the wall of bore 18 bears against the smaller diameter portion 15 of pin 10. This spring 12 defines the biasing force on the arms of the spectacle frame and must be chosen as a function of the desired force.

Figure 5:
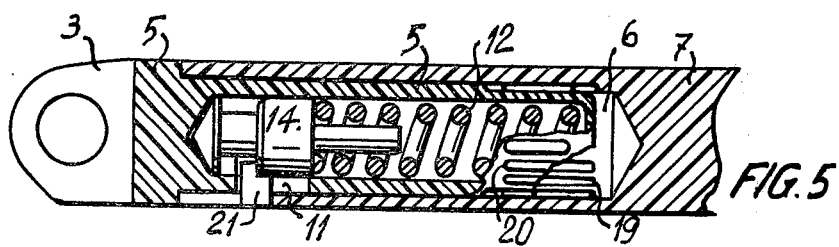
FIG. 5 is a longitudinal cross-section of part of a third embodiment.

In the third embodiment, shown in FIG. 5, parts similar to those of the preceding embodiments are designated by the same reference numerals. The main difference relative to the two previously described examples is that the angular position of the sliding piece 5 in the casing 7 is defined by longitudinal ribs 19 and 20 provided respectively in the rear part of the cylindrical wall of housing 6 of the casing 7 and at the rear end of sliding piece 5. These ribs 19, 20 provide an excellent guiding between the two cylindrical parts, and in view of the number of ribs and their relatively large contacting surfaces, the wear of the ribs is insignificant.

Since the angular position between the piece 5 and casing 7 is defined by the ribs 19 and 20, it is not necessary for a pin to carry out this function; the pin 10 of the two previous embodiments is accordingly replaced by a pin 21 integral with casing 7 and passing through a single slot 11 of the sliding piece 5. The end of this pin 21 forms an abutment for the stud 14 which is a simple turned part without a yoke or a transverse bore.

In this third embodiment, the ribs 19, 20 are located towards the rear end of the cylindrical wall of housing 6 since it is relatively simple to provide them at this location. However, it is clear that the ribs could extend along all of the length of housing 6 or only a portion of this length situated in principle at any location along its inner cylindrical wall.

I claim:
1. In a resilient hinge for a pair of spectacles, comprising a first part rigidly fixed to a spectacle frame, a second part hinged to the first part and resiliently connected to an arm of the pair of spectacles, a casing fixed to said arm, said second part including an integral extension slidably mounted in said casing, a spring disposed in said casing and acting on said extension to bias said second part towards the free end of said arm, the improvement wherein said casing includes a longitudinal cylindrical housing, said extension comprising a tube of circular cross-section slidably mounted in said housing, a stop at the end of said tube, said tube having two longitudinal slots disposed along two diametrically opposed generatrices thereof, a transverse pin in said housing and engaged in said slots, said pin having a median portion and two end portions of greater diameter than said median portion, a yoke-shaped stud interposed between said spring and said pin, said yoke-shaped stud engaging said median portion of said pin between said pin end portions of greater diameter, said spring lodged within said tube and bearing on the one hand against said stud and on the other hand against said stop at the end of said tube, whereby said pin angularly fixes the position of said circular tube in said cylindrical housing to prevent said tube from rotating.

2. A hinge according to claim 1 wherein, said tube has an open end for insertion of said stud and said spring and said stop at the end of said tube includes a deformation of the edge of said tube open end.

3. A hinge according to claim 1 wherein, said tube has an open end for insertion of said stud and said spring and said stop at the end of said tube includes a stopper fixed in the open end of said tube to hold said spring therein.

4. In a resilient hinge for a pair of spectacles, comprising a first part rigidly fixed to a spectacle frame, a second part hinged to the first part and resiliently connected to an arm of the pair of spectacles, a casing fixed to said arm, said second part including an integral extension slidably mounted in said casing, a spring disposed in said casing and acting on said extension to bias said second part towards the free end of said arm, the improvement wherein said casing includes a longitudinal cylindrical housing, said extension comprising a tube of circular cross-section slidably mounted in said housing, a stop at the end of said tube, said tube having at least one longitudinal slot disposed along a generatrix thereof, a transverse pin in said housing and engaged in said slot, a yoke-shaped stud interposed between said spring and said pin said spring lodged within said tube and bearing on the one hand against said stud and on the other hand against said stop at the end of said tube and longitudinal ribs on said tube and housing angularly fixing the position of said circular tube in said cylindrical housing to prevent said tube from rotating.

* * * * *